United States Patent
Ueno (10) Patent No.: US 12,257,924 B2
(45) Date of Patent: Mar. 25, 2025

(54) IN-VEHICLE SYSTEM, METHOD, AND NON-TRANSITORY STORAGE MEDIUM

(71) Applicant: TOYOTA JIDOSHA KABUSHIKI KAISHA, Toyota (JP)

(72) Inventor: Yukiyoshi Ueno, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 18/069,303

(22) Filed: Dec. 21, 2022

(65) Prior Publication Data
US 2023/0264597 A1 Aug. 24, 2023

(30) Foreign Application Priority Data
Feb. 21, 2022 (JP) ................................ 2022-024663

(51) Int. Cl.
*B60L 58/18* (2019.01)
*B60L 58/12* (2019.01)
(Continued)

(52) U.S. Cl.
CPC ............... *B60L 58/18* (2019.02); *B60L 58/12* (2019.02); *H02J 7/0013* (2013.01);
(Continued)

(58) Field of Classification Search
CPC .......... B60R 16/03; B60L 58/12; B60L 58/18; B60W 60/00
See application file for complete search history.

(56) References Cited

U.S. PATENT DOCUMENTS

| 6,265,850 B1 * | 7/2001 | Kimura | H02J 7/0047 |
| | | | 320/137 |
| 9,944,199 B2 * | 4/2018 | Tahara | B60R 16/033 |

(Continued)

FOREIGN PATENT DOCUMENTS

| CN | 106458118 B | * | 9/2018 | .............. B60L 58/21 |
| CN | 116620023 A | * | 8/2023 | ............ B60L 3/0046 |

(Continued)

OTHER PUBLICATIONS

Ashourloo, Mojtaba, et al. "Fault detection in a hybrid Dickson DC-DC converter for 48-V automotive applications." IEEE Transactions on Power Electronics 36.4 (2020): 4254-4268. (Year: 2020).*

(Continued)

*Primary Examiner* — Cuong H Nguyen
(74) *Attorney, Agent, or Firm* — Oblon, McClelland, Maier & Neustadt, L.L.P.

(57) ABSTRACT

An in-vehicle system includes a first battery and a second battery respectively connected to a first load and a second load, a relay that connects the two batteries in parallel, and a processor configured to control turn-on and turn-off of the relay to control a state of electric power supply from the first and second batteries to the first and second loads, detect an abnormality in the first and second batteries, and determine a difference between physical quantities of the two batteries. The processor is further configured to, when detecting the abnormality in the first or second battery, turn off the relay, and when no longer detecting the abnormality in the first and second batteries after the relay is turned off, turn on the relay when the processor determines that the difference between the physical quantities of the two batteries satisfies a predetermined condition.

9 Claims, 9 Drawing Sheets

(51) Int. Cl.
*H02J 7/00* (2006.01)
*B60R 16/03* (2006.01)
*H02J 7/34* (2006.01)

(52) U.S. Cl.
CPC .............. *H02J 7/0063* (2013.01); *B60R 16/03* (2013.01); *H02J 7/00* (2013.01); *H02J 7/34* (2013.01)

(56) References Cited

U.S. PATENT DOCUMENTS

| | | | |
|---|---|---|---|
| 10,386,400 B2 * | 8/2019 | Kawanaka | G01R 31/3277 |
| 11,831,191 B2 * | 11/2023 | Takahashi | G01R 31/3646 |
| 11,833,925 B2 * | 12/2023 | Nishioka | B60W 50/0205 |
| 2007/0120530 A1 * | 5/2007 | Nozaki | H02J 7/00308 320/130 |
| 2019/0359221 A1 | 11/2019 | Ochida et al. | |
| 2022/0111757 A1 * | 4/2022 | Nishioka | B60L 58/20 |
| 2022/0368138 A1 * | 11/2022 | Nishioka | H02J 7/007182 |
| 2023/0101070 A1 * | 3/2023 | Takahashi | G01R 31/40 307/48 |
| 2023/0264597 A1 * | 8/2023 | Ueno | B60L 3/04 701/22 |

FOREIGN PATENT DOCUMENTS

| | | | | |
|---|---|---|---|---|
| CN | 118302333 A | * | 7/2024 | .............. B60R 16/03 |
| DE | 102022134689 A1 | * | 8/2023 | ............. B60L 3/0046 |
| JP | 6572621 B2 | * | 9/2019 | ................ Y02T 10/70 |
| WO | WO-2015079522 A1 | * | 6/2015 | .......... B60L 15/2045 |
| WO | WO-2015174379 A1 | * | 11/2015 | .............. B60L 58/21 |
| WO | WO 2018/154860 A1 | | 8/2018 | |
| WO | WO-2023095342 A1 | * | 6/2023 | .............. B60R 16/03 |

OTHER PUBLICATIONS

Choudhary, Anurag, Shahab Fatima, and B. K. Panigrahi. "State-of-the-art technologies in fault diagnosis of electric vehicles: A component-based review." IEEE Transactions on Transportation Electrification 9.2 (2022): 2324-2347. (Year: 2022).*

Xu, Xiuhua, et al. "Intelligent Power Management System for Vehicle." 2023 IEEE International Conference on Power Science and Technology (ICPST). IEEE, 2023. (Year: 2023).*

Kompass, Klaus, et al. "Safety of Electro Mobility-White Paper of the FISITA Intelligent Safety Working Group." 27th International Technical Conference on the Enhanced Safety of Vehicles (ESV) National Highway Traffic Safety Administration. No. 23-0178. 2023. (Year: 2023).*

* cited by examiner

| DIFFERENCE IN STATE OF CHARGE [%] \ TEMPERATURE [°C] | -30 | -20 | -10 | 0 | 10 | 20 | 30 | 40 | 50 | 60 | 70 |
|---|---|---|---|---|---|---|---|---|---|---|---|
| 100 | 0 | 0 | 0 | 0 | 0 | 0 | 0 | 0 | 0 | 0 | 0 |
| 90 | 0 | 0 | 0 | 0 | 0 | 0 | 0 | 0 | 0 | 0 | 0 |
| 80 | 0 | 0 | 0 | 0 | 0 | 1 | 1 | 1 | 1 | 1 | 1 |
| 70 | 0 | 0 | 0 | 1 | 1 | 1 | 1 | 1 | 1 | 1 | 1 |
| 60 | 0 | 1 | 1 | 1 | 1 | 1 | 1 | 1 | 1 | 1 | 1 |
| 50 | 1 | 1 | 1 | 1 | 1 | 1 | 1 | 1 | 1 | 1 | 1 |
| 40 | 1 | 1 | 1 | 1 | 1 | 1 | 1 | 1 | 1 | 1 | 1 |
| 30 | 1 | 1 | 1 | 1 | 1 | 1 | 1 | 1 | 1 | 1 | 1 |
| 20 | 1 | 1 | 1 | 1 | 1 | 1 | 1 | 1 | 1 | 1 | 1 |
| 10 | 1 | 1 | 1 | 1 | 1 | 1 | 1 | 1 | 1 | 1 | 1 |
| 0 | 1 | 1 | 1 | 1 | 1 | 1 | 1 | 1 | 1 | 1 | 1 |

IN-VEHICLE SYSTEM, METHOD, AND NON-TRANSITORY STORAGE MEDIUM

CROSS-REFERENCE TO RELATED APPLICATION

This application claims priority to Japanese Patent Application No. 2022-024663 filed on Feb. 21, 2022, incorporated herein by reference in its entirety.

BACKGROUND

1. Technical Field

The present disclosure relates to an in-vehicle system, a method, and a non-transitory storage medium.

2. Description of Related Art

WO 2018/154860 discloses a control system with in-vehicle load and battery redundancy to ensure electric power supply and improve system reliability.

SUMMARY

There is a control system in which electric power is supplied simultaneously from two batteries connected in parallel to loads redundantly arranged in two systems at normal times, when one of the batteries fails, the two batteries are electrically disconnected and a backup operation is performed by continuing electric power supply from the other normal battery to the load of a system connected to the battery.

In the control system, for example, there may be a case in which the backup operation is performed once and then the two batteries are reconnected, such as a case in which a momentary erroneous determination is made that a battery is abnormal due to disturbance noise and then return to normal is made. In such a case, when the two batteries are connected without any operation, the difference between physical quantities of the battery of the electric power consumed in the backup operation and the battery of unconsumed electric power may cause excessive current flow between the batteries.

The present disclosure provides an in-vehicle system and the like that can suppress excessive current flow between batteries due to a difference between physical quantities of two batteries connected in parallel.

A first aspect of the present disclosure relates to an in-vehicle system. The in-vehicle system includes a first battery, a second battery, a relay, and a processor. The first battery is connected to a first load and configured to supply electric power to the first load. The second battery is connected to a second load and configured to supply electric power to the second load. The relay connects the first battery and the second battery in parallel. The processor is configured to control turn-on and turn-off of the relay to control a state of electric power supply from the first battery and the second battery to the first load and the second load, detect an abnormality in the first battery and the second battery, and determine a difference between a physical quantity indicating a state of the first battery and a physical quantity indicating a state of the second battery. The processor is further configured to, when the processor detects the abnormality in the first battery or the second battery, turn off the relay, and when the processor no longer detects the abnormality in the first battery and the second battery after the relay is turned off, turn on the relay when the processor determines that the difference between the physical quantities of the first battery and the second battery satisfies a predetermined condition.

A second aspect of the present disclosure relates to a method that is executed by a computer of an in-vehicle system. The in-vehicle system includes a first battery connected to a first load and configured to supply electric power to the first load, a second battery connected to a second load and configured to supply the electric power to the second load, and a relay that connects the first battery and the second battery in parallel. The method includes: monitoring the first battery and the second battery, and turning off the relay when an abnormality in the first battery or the second battery is detected; determining, when the abnormality in the first battery or the second battery is no longer detected after the relay is turned off, whether a difference between a physical quantity indicating a state of the first battery and a physical quantity indicating a state of the second battery satisfies a predetermined condition; and turning on the relay when a determination is made that the difference between the physical quantities of the first battery and the second battery satisfies the predetermined condition.

A third aspect of the present disclosure relates to a non-transitory storage medium storing instructions. The instructions are executable by a processor of a computer of an in-vehicle system including a first battery connected to a first load and configured to supply electric power to the first load, a second battery connected to a second load and configured to supply the electric power to the second load, and a relay that connects the first battery and the second battery in parallel, and that cause the processor to perform the following functions. The functions include monitoring the first battery and the second battery, and turning off the relay when an abnormality in the first battery or the second battery is detected, when the abnormality in the first battery or the second battery is no longer detected after the relay is turned off; determining whether a difference between a physical quantity indicating a state of the first battery and a physical quantity indicating a state of the second battery satisfies a predetermined condition; and turning on the relay when a determination is made that the difference between the physical quantities of the first battery and the second battery satisfies the predetermined condition.

According to the in-vehicle system and the like of the present disclosure, excessive current flow between the first battery and the second battery due to the difference between the physical quantities of the first battery and the second battery connected in parallel can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a state of each relay when an ignition switch is on;

DETAILED DESCRIPTION OF EMBODIMENTS

An in-vehicle system according to the present disclosure has a configuration in which a main battery connected to a main functional unit and a sub-battery connected to a redundant sub-functional unit are connected in parallel by a relay. In the in-vehicle system having the configuration, when an abnormality is detected in either one of the two batteries, the relay is turned off to electrically separate the main battery and the sub-battery. Then, in the in-vehicle system, when the abnormality is no longer detected in the two batteries, the voltage difference between the main battery and the sub-battery is reduced, and then the relay is turned on again. The above-mentioned control can suppress excessive current flow between the two batteries.

Hereinafter, an embodiment of the present disclosure will be described in detail with reference to the drawings.

Configuration

Figure 1:
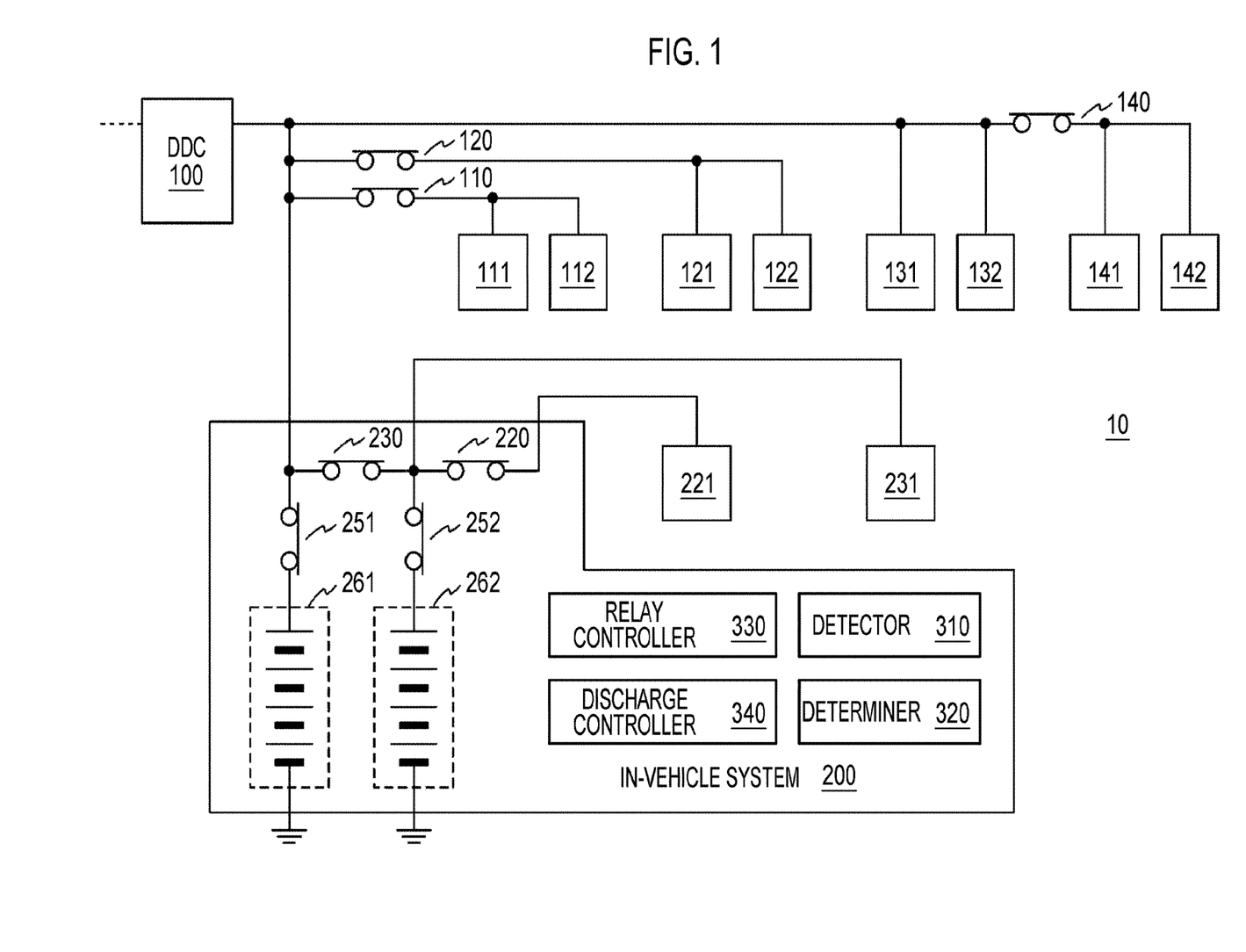
FIG. 1 is a schematic configuration diagram of a system including an in-vehicle system according to an embodiment of the present disclosure.

FIG. 1 is a diagram showing a schematic configuration of a system 10 including an in-vehicle system 200 according to an embodiment of the present disclosure. The system 10 illustrated in FIG. 1 includes a direct current-direct current (DCDC) converter (DDC) 100, an in-vehicle system 200, a first power supply system including first loads 111, 112, 121, 122, 131, 132, 141, 142, and a second power supply system including second loads 221, 231. The system 10 may be mounted, for example, in an electrified vehicle, such as hybrid electric vehicles (HEV) using an electric motor as a power source, plug-in hybrid electric vehicles (PHEV), and battery electric vehicle (BEV).

The DCDC converter 100 is an electric power converter that may convert high-voltage electric power supplied from a high-voltage battery (not shown), such as a lithium-ion battery into predetermined electric power of a low-voltage and output the converted electric power. The DCDC converter 100 may output (supply) electric power to the first loads 111, 112, 121, 122, 131, 132, 141, 142 and the second loads 221, 231. In addition, the DCDC converter 100 may output (supply) electric power to charge a first battery 261 and a second battery 262 of the in-vehicle system 200, which will be described later.

(1) First Power Supply System

A first power supply system is a power supply system for supplying electric power to a load (in-vehicle equipment) that operates at a low voltage, which is called an auxiliary machine. The first power supply system includes first loads 111, 112, 121, 122, 131, 132, 141, 142. The configuration of the first power supply system shown in FIG. 1 is an example, and the present disclosure is not limited to the configuration.

The first loads 111, 112 are connected to the DCDC converter 100 and the in-vehicle system 200 through a relay 110 (hereinafter referred to as "IGP relay 110") which is turned into a conducting state when an ignition switch of the vehicle is turned on (IGSW-ON). The first loads 111, 112 may be loads for implementing functions of a vehicle that does not need a redundant configuration.

The first loads 121, 122 are connected to the DCDC converter 100 and the in-vehicle system 200 through a relay 120 (hereinafter referred to as "IGR relay 120") which is turned into the conducting state when an ignition switch of the vehicle is turned on (IGSW-ON). The first loads 121, 122 may be loads for implementing functions of a vehicle that needs a redundant configuration.

The first loads 131, 132 are directly connected to the DCDC converter 100 and the in-vehicle system 200 without relays. The first loads 131, 132 may be loads for implementing functions of a vehicle that needs a redundant configuration.

The first loads 141, 142 are connected to the DCDC converter 100 and the in-vehicle system 200 through a relay 140 (hereinafter referred to as "+BA relay 140") which is turned into the conducting state when an ignition switch of the vehicle is turned on (IGSW-ON). The first loads 141, 142 may be loads for implementing functions of a vehicle that does not need a redundant configuration.

The turn-on and turn-off of the IGP relay 110, IGR relay 120, and +BA relay 140 may be controlled by control means (not shown), or may be controlled by the in-vehicle system 200. An excitation type mechanical relay or a semiconductor relay may be used for the relays.

(2) Second Power Supply System

The second power supply system is a power supply system for supplying electric power to a load (in-vehicle equipment) redundantly arranged with respect to the load (in-vehicle equipment) connected to the first power supply system. The second power supply system includes second loads 221, 231. The configuration of the second power supply system shown in FIG. 1 is an example, and the present disclosure is not limited to the configuration.

The second load 221 is connected to the in-vehicle system 200 and is also connected to the DCDC converter 100 through relays 220, 230 which will be described later. The second load 221 is redundantly provided with respect to the first load 121.

The second load 231 is connected to the in-vehicle system 200 and is also connected to the DCDC converter 100 through a disconnection relay 230. The second load 231 is redundantly provided with respect to the first load 131.

(3) In-Vehicle System

The in-vehicle system 200 has a configuration for controlling the state of electric power supply to the first loads 111, 112, 121, 122, 131, 132, 141, 142 of the first power supply system and the second loads 221, 231 of the second power supply system.

The in-vehicle system 200 includes the relay 220 (hereinafter referred to as "IG2 relay 220"), the relay 230 (hereinafter referred to as "disconnection relay 230"), a relay 251 (hereinafter referred to as "BAT1 relay 251"), a relay 252 (hereinafter referred to as "BAT2 relay 252"), the first battery 261, the second battery 262, a detector 310, a determiner 320, a relay controller 330, and a discharge controller 340.

The IG2 relay 220, the disconnection relay 230, the BAT1 relay 251, and the BAT2 relay 252 switch between the turn-on state and the turn-off state according to control by the relay controller 330. An excitation type mechanical relay or a semiconductor relay may be used for the relays.

The first battery 261 is a power supply capable of supplying electric power to the first loads 111, 112, 121, 122, 131, 132, 141, 142 and the second loads 221, 231. The first battery 261 is a stack (assembled battery) configured by connecting a plurality of single battery cells, which are secondary batteries, such as lithium-ion batteries configured to be rechargeable and dischargeable, in series. The first battery 261 is connected to the first loads 111, 112, 121, 122, 131, 132, 141, 142 of the first power supply system through the BAT1 relay 251, and is connected to the second loads 221, 231 of the second power supply system through the BAT1 relay 251, the disconnection relay 230, and the IG2 relay 220.

The second battery 262 is a power supply capable of supplying electric power to the first loads 111, 112, 121, 122, 131, 132, 141, 142 and the second loads 221, 231. The second battery 262 is a stack (assembled battery) configured by connecting a plurality of single battery cells, which are secondary batteries such as lithium-ion batteries configured to be rechargeable and dischargeable, in series. The second battery 262 is connected to the first loads 111, 112, 121, 122, 131, 132, 141, 142 of the first power supply system through the BAT2 relay 252 and the disconnection relay 230, and is connected to the second loads 221, 231 of the second power supply system through the BAT2 relay 252 and the IG2 relay 220.

Batteries having the same specified voltage are used for the first battery 261 and the second battery 262. Furthermore, one or both of the first battery 261 and the second battery 262 may be constituted by a plurality of stacks.

The detector 310 is a functional unit that detects an abnormality in the first battery 261 and the second battery 262. Examples of battery abnormalities detected by the detector 310 include a decrease in output voltage and an increase in output current (outflow current) due to a short circuit in a single battery cell, a ground fault in a connection system, or the like. The detection may be performed, for example, based on values detected by voltage sensors, current sensors provided in the first battery 261 and the second battery 262.

The determiner 320 is a functional unit that acquires a physical quantity indicating the state of the first battery 261 and a physical quantity indicating the state of the second battery 262, and determines the difference between the two acquired physical quantities. Examples of physical quantities that indicate the state of the battery include a voltage value, a current value, a state of charge (SOC), and temperature. The physical quantity may be acquired and calculated, for example, based on values detected by various sensors (voltage, current, temperature, and the like) provided in the first battery 261 and the second battery 262. The difference between the physical quantities is, for example, the difference between the voltage value of the first battery 261 and the voltage value of the second battery 262 or the difference between the state of charge of the first battery 261 and the state of charge of the second battery 262.

The relay controller 330 is a functional unit that controls the turn-on and turn-off states of the IG2 relay 220, the disconnection relay 230, the BAT1 relay 251, and the BAT2 relay 252 based on a detection result of the battery abnormality in the detector 310 and a determination result of the difference between physical quantities of the batteries in the determiner 320. By the state control of each relay, the relay controller 330 controls the state of the electric power supply to the first loads 111, 112, 121, 122, 131, 132, 141, 142 and the second loads 221, 231 from the first battery 261 and the second battery 262. The control of the state of each relay will be described later.

The discharge controller 340 is a functional unit that performs a discharging process for reducing the physical quantity difference (output voltage difference, state-of-charge difference, or the like) of the first battery 261 or the second battery 262, based on the detection result of the battery abnormality in the detector 310 and the determination result of the difference between physical quantities of the batteries in the determiner 320. The discharging process will be described later.

Some or all of the detector 310, the determiner 320, the relay controller 330, and the discharge controller 340 of the in-vehicle system 200 described above may be typically an electronic control unit (ECU) including a processor, a memory, an input and output interface, and the like. The electronic control unit implements the functions of each component by reading and executing a program stored in the memory by the processor.

Control

Figure 2:
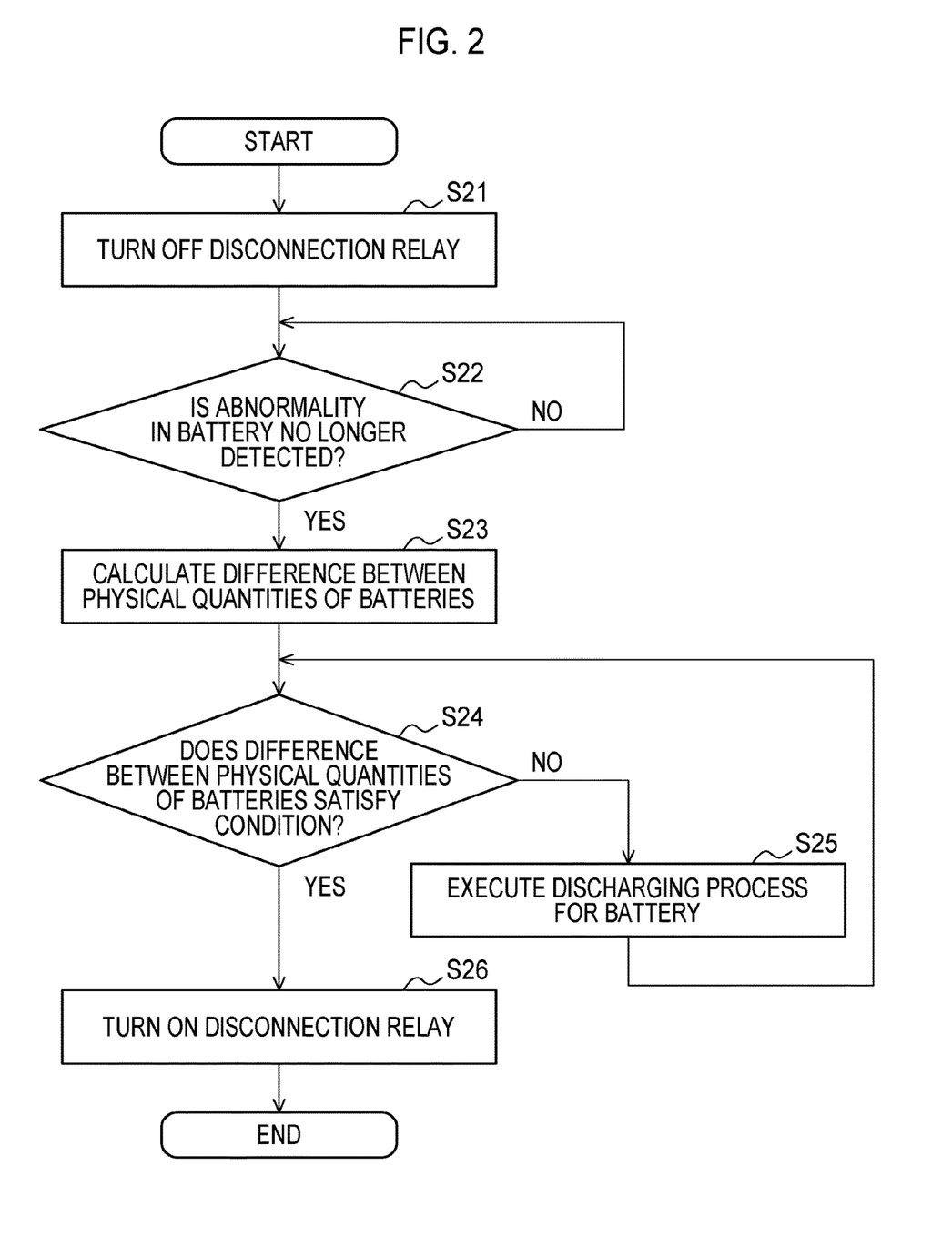
FIG. 2 is a flowchart of a process for electric power supply relay control executed by the in-vehicle system according to the present embodiment.

The control performed by the in-vehicle system 200 according to the present embodiment will be described with further reference to FIGS. 2 to 9. FIG. 2 is a flowchart illustrating a procedure of a process for electric power supply relay control executed by each component of the in-vehicle system 200.

Figure 3:
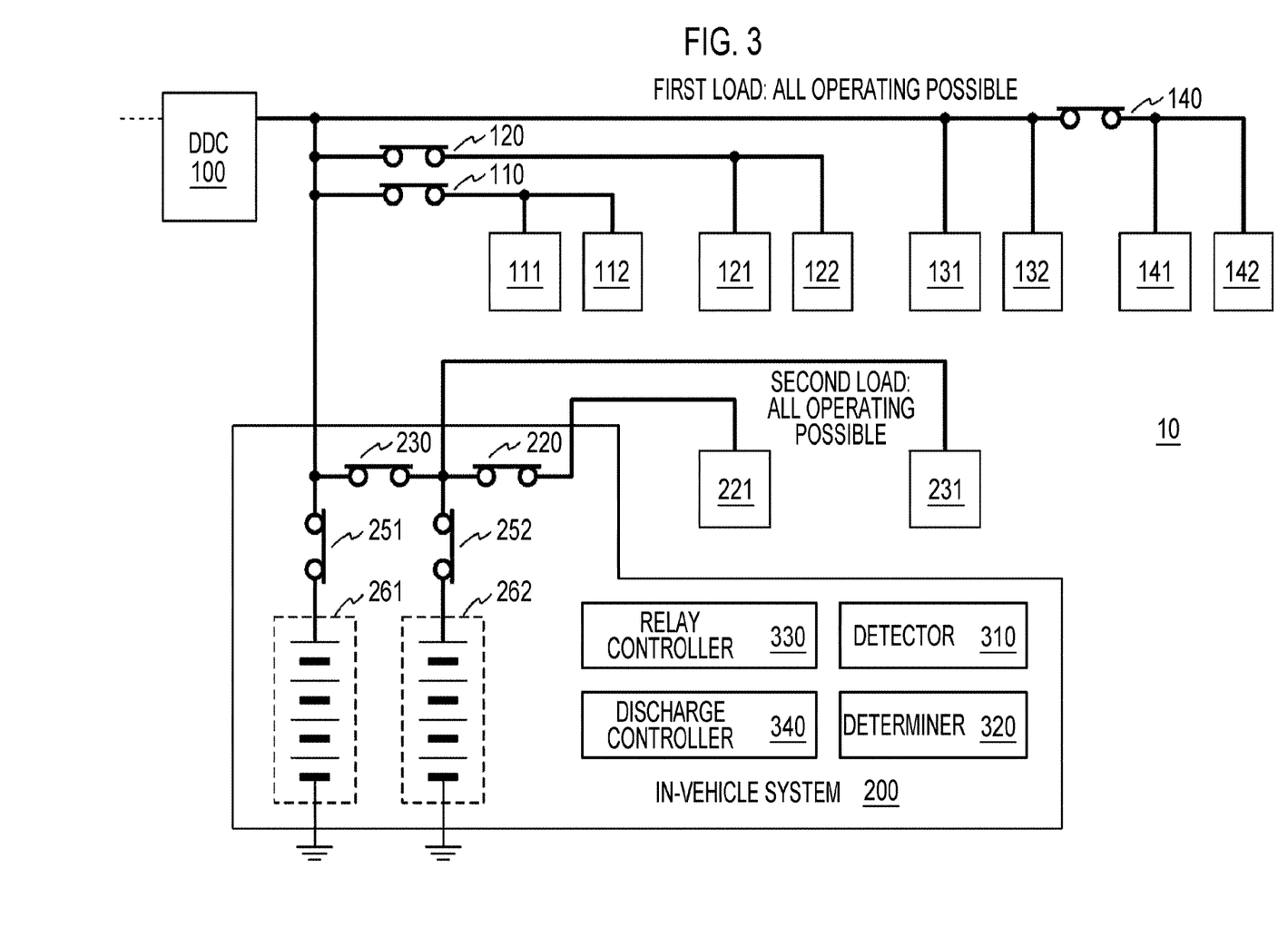

In the following description, as illustrated in FIG. 3, in a state of both ignition switches of the vehicle being on (IGSW-ON), all of the IGP relay 110, the IGR relay 120, +BA relay 140, the IG2 relay 220, the disconnection relay 230, the BAT1 relay 251, and the BAT2 relay 252 are set to be in a connected state. That is, the first loads 111, 112, 121, 122, 131, 132, 141, 142 and the second loads 221, 231 are all in an operable state. In addition, in FIG. 3, a thick line indicates that electric power is being supplied.

Figure 4:
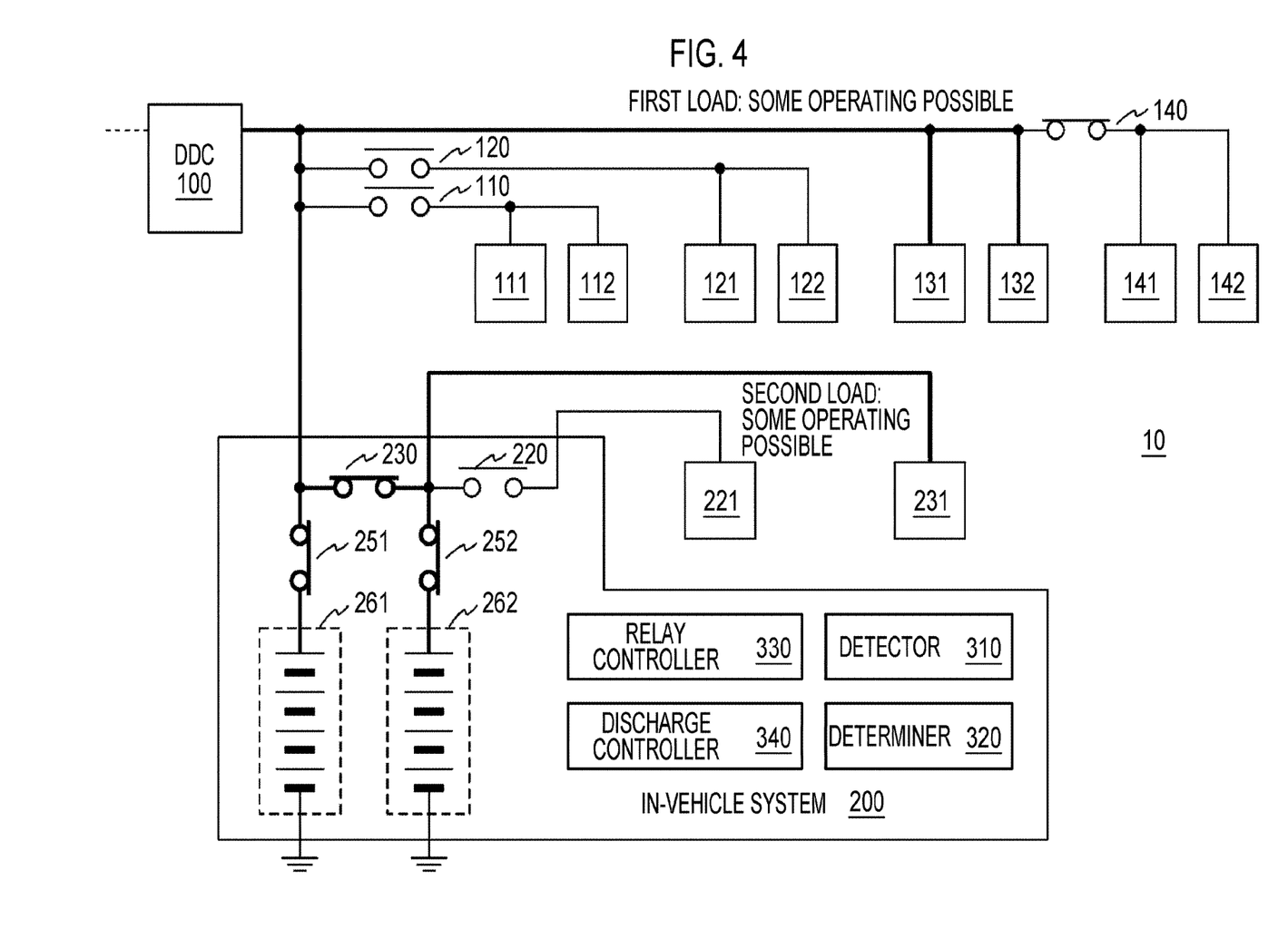
FIG. 4 is a diagram illustrating a state of each relay when the ignition switch is off.

As illustrated in FIG. 4, in a state of the ignition switches of the vehicle being off (IGSW-OFF), with the IGP relay 110, the IGR relay 120, the +BA relay 140, and the IG2 relay 220 being turned off, and with the disconnection relay 230, the BAT1 relay 251, and the BAT2 relay 252 being turned on, a control is executed, such that electric power is supplied just to some loads (the first load 131, the first load 132, and the second load 231) that needs minimal operation. In addition, in FIG. 4, a thick line indicates that electric power is being supplied.

When the detector 310 detects an abnormality in the first battery 261 or the second battery 262 while the ignition switch of the vehicle is on (IGSW-ON), an electric power supply relay control shown in FIG. 2 is started.

Step S21

The relay controller 330 turns off the disconnection relay 230. Thereby, the first battery 261 and the second battery 262 are electrically separated. At this time, the relay controller 330 may turn off the BAT1 relay 251 or the BAT2 relay 252 inserted on the side of the battery in which the abnormality is detected, at the same time as the turn-off of the disconnection relay 230. By turning off the relays, it is possible to prevent current from continuing to flow out of the battery, for example, in the event of a ground fault in the power supply system.

Figure 5:
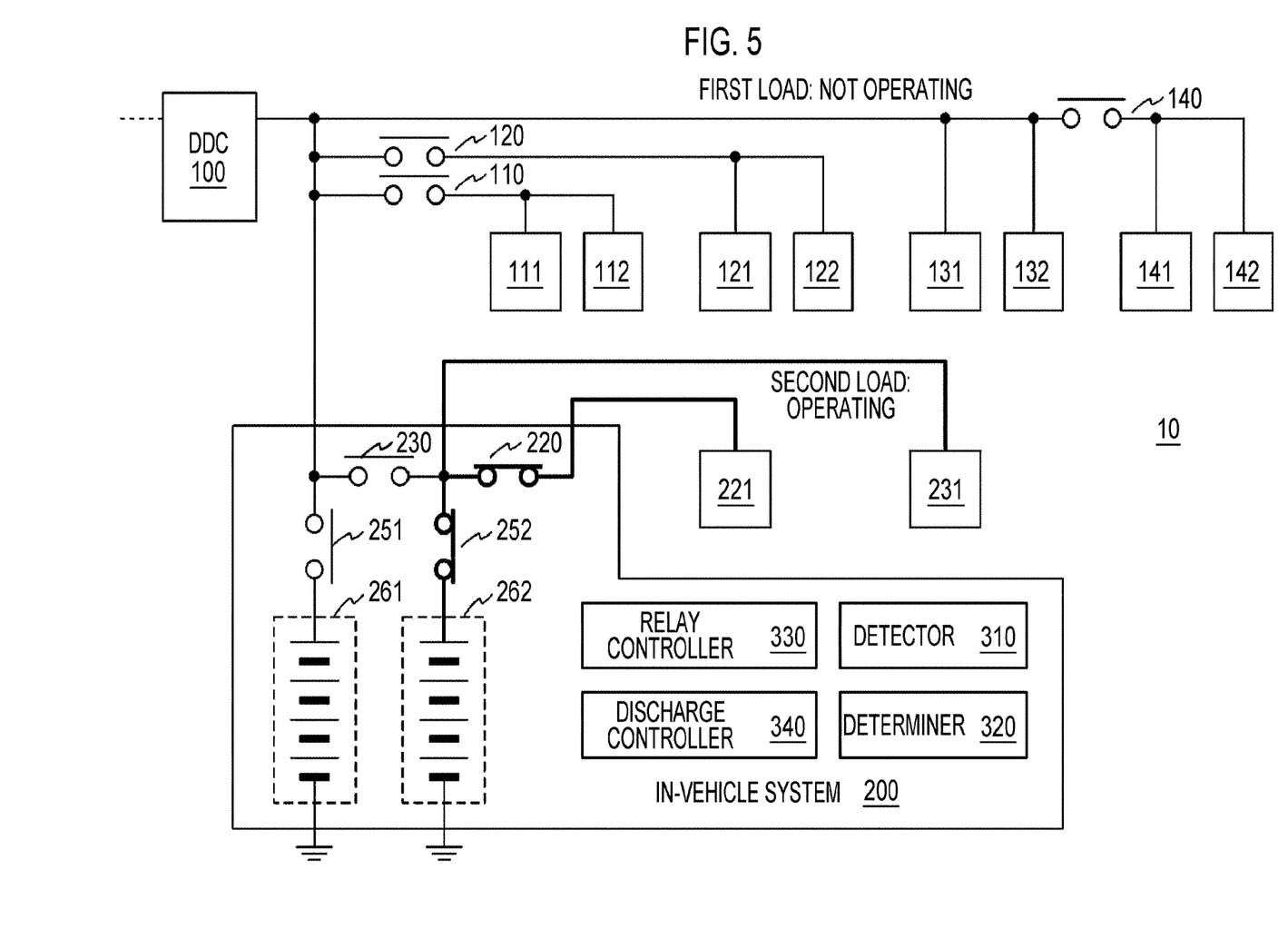
FIG. 5 is a diagram illustrating a state of each relay when an abnormality is detected in a first battery.

FIG. 5 shows an example of relay control when an abnormality is detected in the first battery 261. In the example of FIG. 5, the IGP relay 110, the IGR relay 120, the +BA relay 140, the disconnection relay 230, and the BAT1 relay 251 are turned off, and the IG2 relay 220 and the BAT2 relay 252 are turned on. With such relay control, even when an abnormality is detected in the first battery 261, electric power can be continuously supplied from the normal second battery 262 to the second loads 221, 231 of the redundant configuration, and the operations of the loads can be maintained. In addition, in FIG. 5, a thick line indicates that electric power is being supplied.

Figure 6:
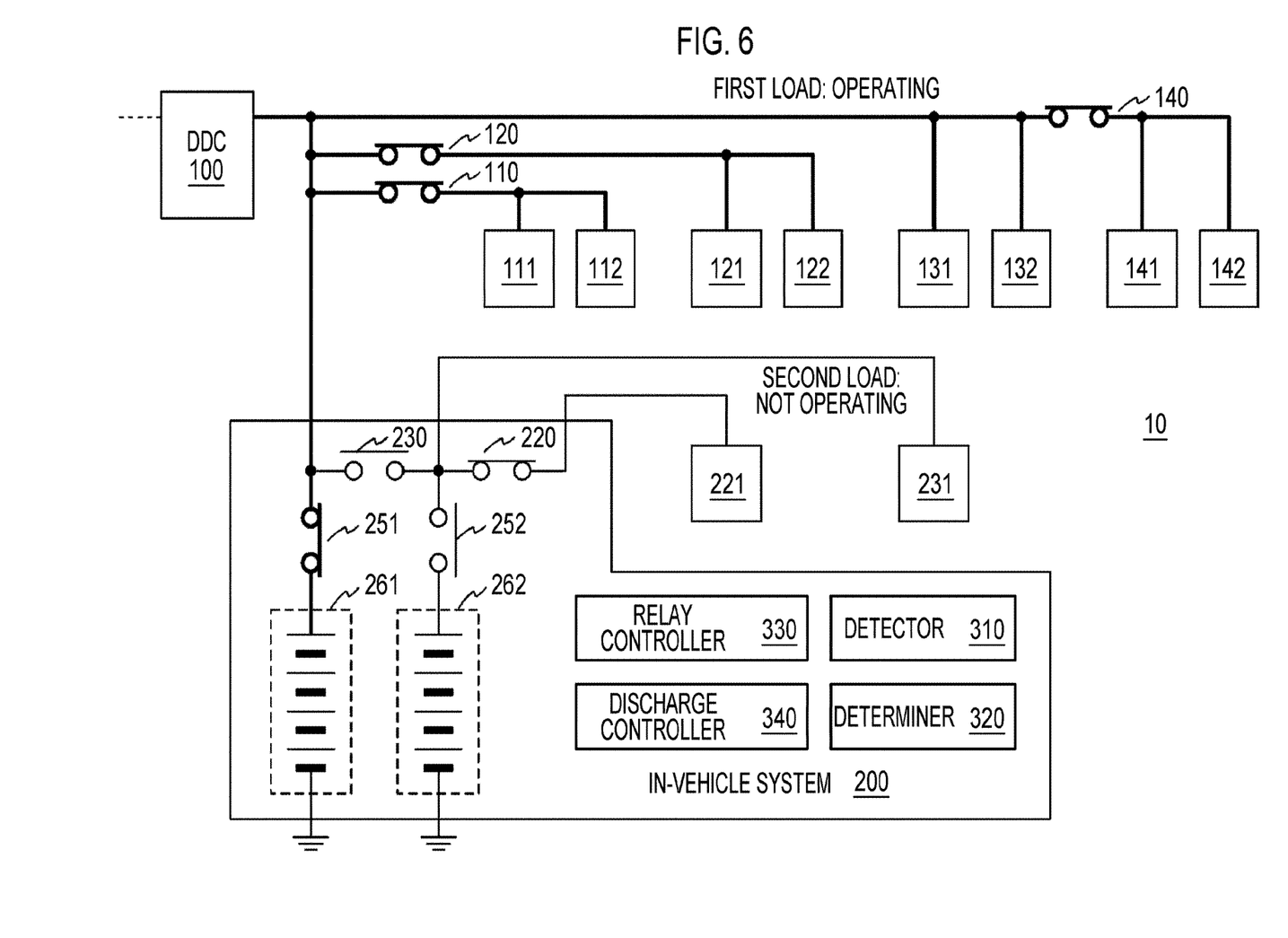
FIG. 6 is a diagram illustrating a state of each relay when an abnormality is detected in a second battery.

Further, FIG. 6 shows an example of relay control when an abnormality is detected in the second battery 262. In the example of FIG. 6, the disconnection relay 230 and BAT2 relay 252 are turned off, and the IGP relay 110, the IGR relay 120, the +BA relay 140, the IG2 relay 220, and the BAT1 relay 251 are turned on. With such relay control, even when an abnormality is detected in the second battery 262, electric power can be continuously supplied from the normal first battery 261 to the first loads 111, 112, 121, 122, 131, 132, 141, 142, and the operations of the loads can be maintained. In addition, in FIG. 6, a thick line indicates that electric power is being supplied.

When at least the disconnection relay 230 is turned off by the relay controller 330, the process proceeds to step S22.
Step S22

The detector 310 determines whether the abnormality in the first battery 261 and the second battery 262 is no longer detected after the relay controller 330 turns off the disconnection relay 230. The determination is made to determine an event in which there is no problem with the system 10 itself, such as a case in which a momentary erroneous determination is made that a battery is abnormal due to disturbance noise or the like and then return to normal is made.

When the detector 310 determines that the abnormality in the first battery 261 and the second battery 262 is no longer detected (Yes in step S22), the process proceeds to step S23. On the other hand, while the abnormality in the first battery 261 or the second battery 262 is detected (No in step S22), the disconnection relay 230 remains off.
Step S23

The determiner 320 acquires a physical quantity (voltage, state of charge, or the like) indicating the state of the first battery 261 and a physical quantity (voltage, state of charge, or the like) indicating the state of the second battery 262, and calculates the difference between the acquired two acquired physical quantities (voltage difference, state-of-charge difference, or the like). When the in-vehicle system 200 has three or more batteries (or stacks), the difference between the maximum value and the minimum value of a plurality of physical quantities may be calculated.

When the determiner 320 calculates the difference between the physical quantities of the first battery 261 and the second battery 262, the process proceeds to step S24.
Step S24

The determiner 320 determines whether the calculated difference between the physical quantities of the first battery 261 and the second battery 262 satisfies a predetermined condition. The determination is made to determine whether or not there is a risk that a large amount of current will flow between the batteries when the first battery 261 and the second battery 262 are connected. Examples of a large amount of current include current that may cause deterioration of single battery cells, current that may lead to failures in circuit components, and current that may cause discomfort to occupants of the vehicle. Therefore, the predetermined condition is set to restrain such a large amount of current from flowing between the batteries.

For example, when the physical quantity is voltage, it is possible to set the voltage difference corresponding to the upper limit current value (withstand current value) that the battery can withstand as the first threshold value, and to determine that the predetermined condition is satisfied when the absolute value difference (voltage difference) between the voltage of the first battery 261 and the voltage of the second battery 262 is less than or equal to the first threshold value. Alternatively, when the physical quantity is the state of charge, it is possible to set the state-of-charge difference corresponding to the withstand current value as the second threshold value, and to determine that the predetermined condition is satisfied when the absolute value difference (state-of-charge difference) between the state of charge of the first battery 261 and the state of charge of the second battery 262 is less than or equal to the second threshold value.

Figure 9:
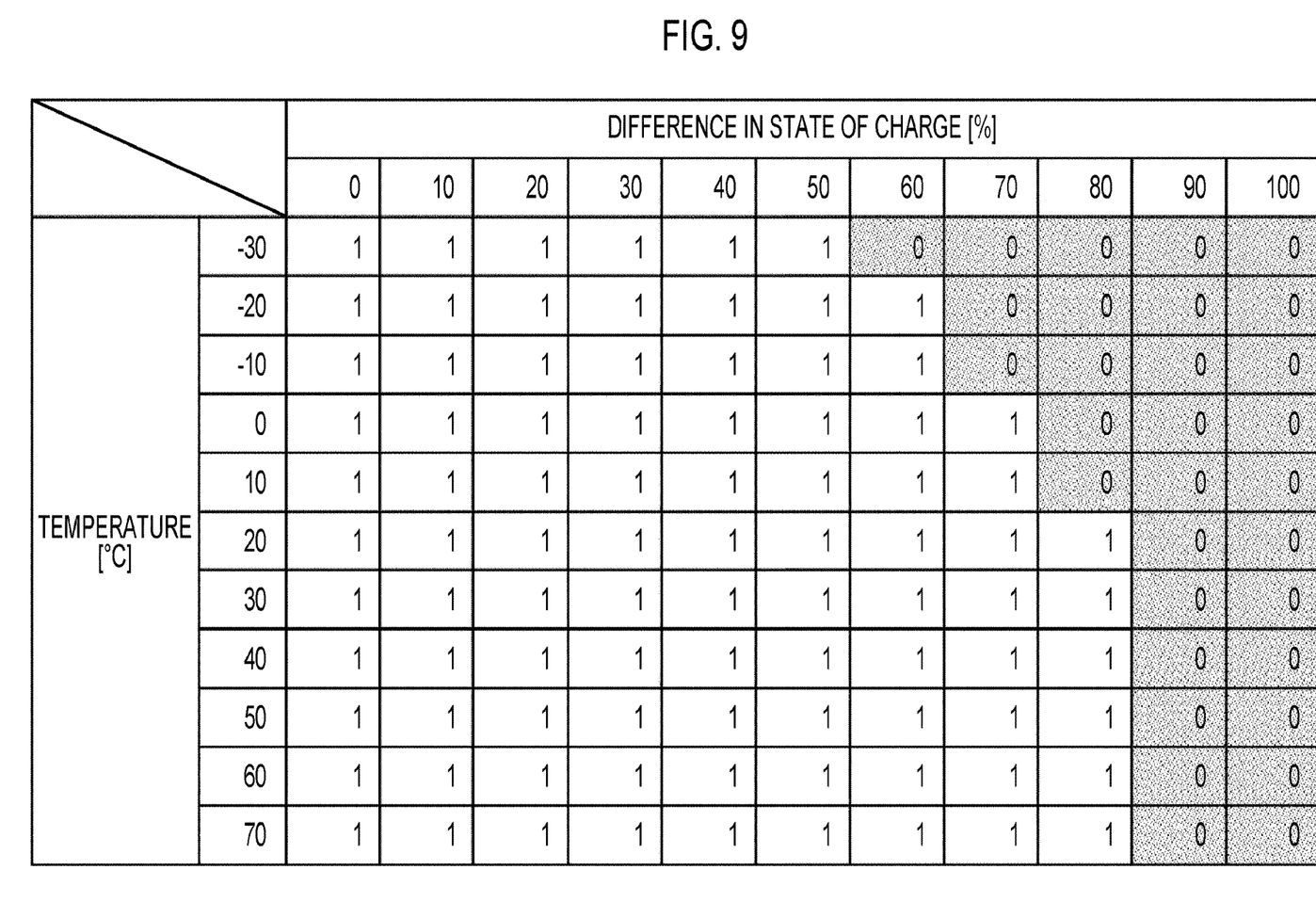
FIG. 9 is a diagram showing an example of a condition matching determination map.

The first battery 261 and the second battery 262 are affected by temperature, and accordingly, the determination as to whether the difference between physical quantities of the first battery 261 and the second battery 262 satisfies a predetermined condition may be made based on the temperature of the batteries in addition to the first threshold value and the second threshold value. FIG. 9 shows an example of a condition matching determination map using the difference between absolute values (difference in state of charge) of the state of charge of the first battery 261 and the state of charge of the second battery 262 and the battery temperature as parameters. In the example of FIG. 9, a battery state of "1" on the map is determined to satisfy the predetermined condition, and a battery state of "0" on the map is determined not to satisfy the predetermined condition.

When the determiner 320 determines that the difference between the physical quantities of the first battery 261 and the second battery 262 satisfies the predetermined condition (Yes in step S24), the process proceeds to step S26. When the determiner 320 determines that the difference between the physical quantities of the first battery 261 and the second battery 262 does not satisfy the predetermined condition (No in step S24), the process proceeds to step S25.
Step S25

The discharge controller 340 executes the discharging process for decreasing the physical quantity (voltage, state of charge, or the like) of the first battery 261 or the second battery 262. In general, it is estimated that the physical quantity of the battery in which the abnormality is detected by the detector 310, which triggers the start of the electric power supply relay control, remains high without being consumed. Therefore, the discharge controller 340 executes a predetermined discharging process on the battery in which the abnormality is detected. Specifically, the discharging process is performed by consuming electric power by a load that is connected without going through the disconnection relay 230.

Figure 7:
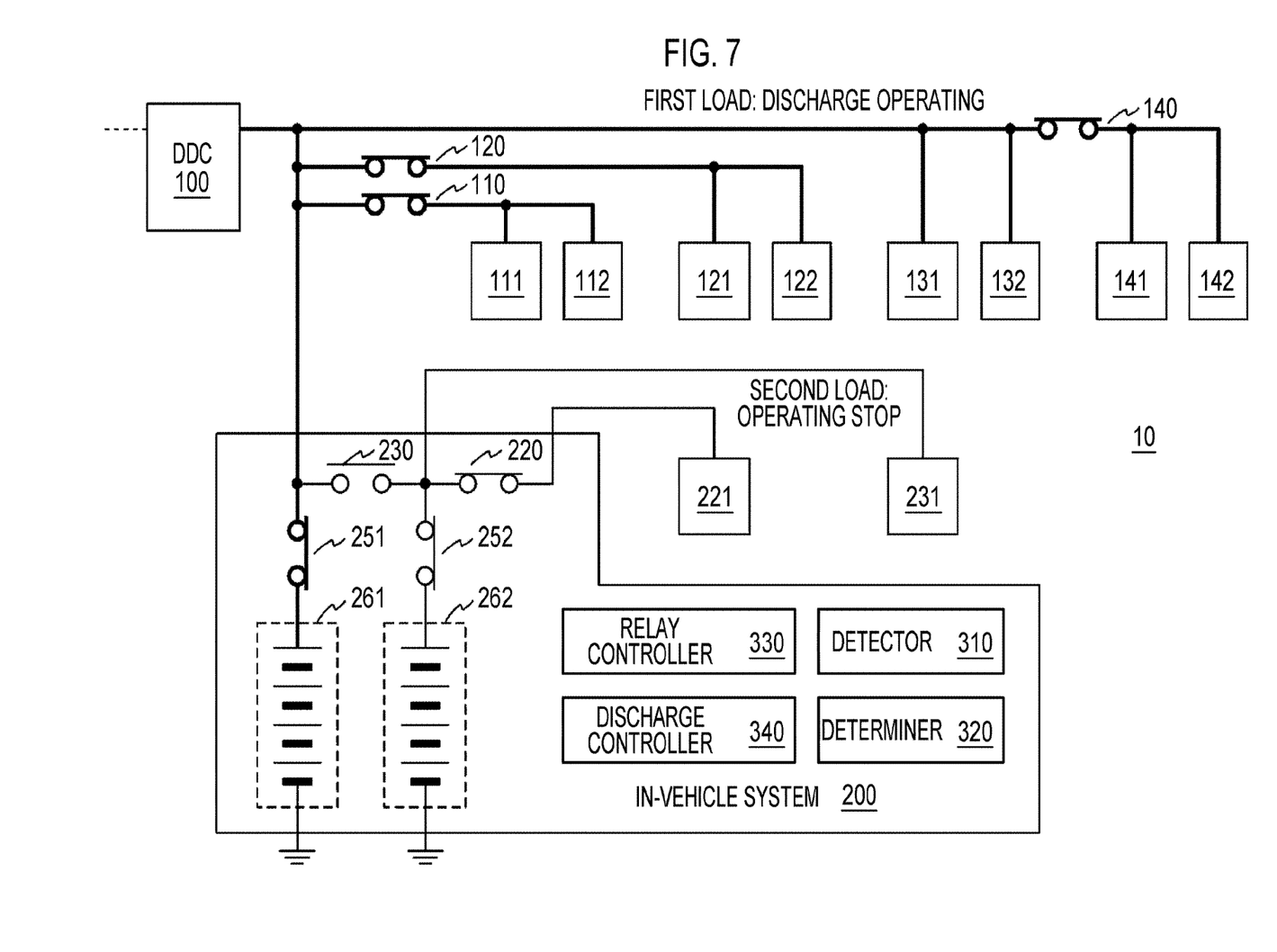
FIG. 7 is a diagram illustrating a state of each relay when a discharging process for the first battery is executed.

FIG. 7 shows an example of the discharging process when an abnormality is detected in the first battery 261 and the electric power supply relay control is started. In the example of FIG. 7, by turning on the IGP relay 110, the IGR relay 120, the +BA relay 140, and the BAT1 relay 251 in a state in which the disconnection relay 230 is turned off, the electric power of the first battery 261 is consumed by the first loads 111, 112, 121, 122, 131, 132, 141, 142 (discharging operation), while the operation of the second loads 221, 231 are stopped. In addition, in FIG. 7, a thick line indicates that electric power is being supplied. Thereby, the physical quantity (voltage, state of charge, or the like) of the first battery 261 gradually decreases and approaches the physical quantity (voltage, state of charge, or the like) of the second battery 262.

Figure 8:
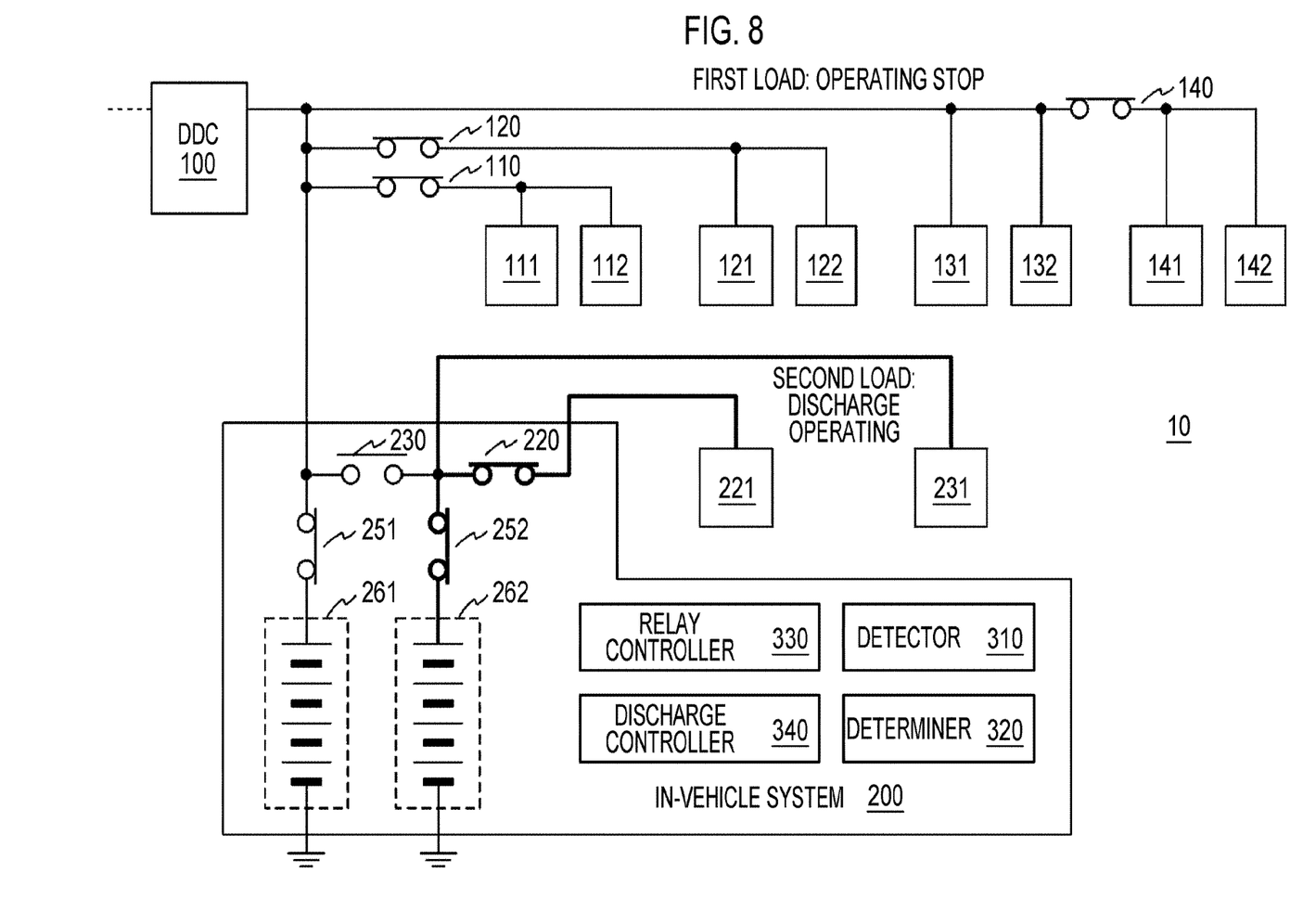
FIG. 8 is a diagram illustrating a state of each relay when a discharging process for the second battery is executed.

FIG. 8 shows an example of the discharging process when an abnormality is detected in the second battery 262 and the electric power supply relay control is started. In the example of FIG. 8, by turning on the IG2 relay 220 and the BAT2 relay 252 in the state in which the disconnection relay 230 is turned off, the electric power of the second battery 262 is consumed by the second loads 221, 231 (discharging operation), while the operation of the first loads 111, 112, 121, 122, 131, 132, 141, 142 are stopped. In addition, in FIG. 8, a thick line indicates that electric power is being supplied. Thereby, the physical quantity (voltage, state of charge, or the like) of the second battery 262 gradually decreases and approaches the physical quantity (voltage, state of charge, or the like) of the first battery 261.

When the discharge controller 340 executes the discharging process for decreasing the physical quantity (voltage, state of charge, or the like) of the first battery 261 or the second battery 262, the process proceeds to step S24.

Step S26

The relay controller 330 turns on the disconnection relay 230. At this time, the relay controller 330 also turns on the IGP relay 110, the IGR relay 120, the +BA relay 140, the IG2 relay 220, the BAT1 relay 251, and the BAT2 relay 252. Thereby, the first battery 261 and the second battery 262 are electrically connected, and the system 10 returns to the power supply state shown in FIG. 3.

When the disconnection relay 230 and the like are turned on by the relay controller 330, the electric power supply relay control ends.

Action and Effect

As described above, the in-vehicle system 200 according to an embodiment of the present disclosure has the configuration in which the first battery 261 connected to the main functional unit (first load) to be able to supply electric power and the second battery 262 connected to a sub-functional unit (second load) of the redundant configuration to be able to supply electric power are connected in parallel with the disconnection relay 230, in which when an abnormality is detected in either one of the first battery 261 and the second battery 262, the disconnection relay 230 is turned off to electrically separate the first battery 261 and the second battery 262.

With the control, even when an abnormality occurs in one battery among the batteries, the in-vehicle system 200 can continue to supply electric power to a load that demands the electric power from the other battery at a normal state, whereby it is possible to continue to perform operations of functions needed in the system 10 (for example, evacuation behavior in autonomous driving).

Further, in the in-vehicle system 200 according to an embodiment of the present disclosure, when the abnormality in the first battery 261 and the second battery 262 is no longer detected after the disconnection relay 230 is turned off, the difference between physical quantities of (voltage, state of charge, or the like) of the first battery 261 and the second battery 262 is reduced to satisfy the condition for preventing a large amount of current from flowing, and then the disconnection relay 230 is turned on back to reassume the system 10.

With the control, the in-vehicle system 200 can restrain excessive current flowing between the first battery 261 and the second battery 262.

An embodiment of the disclosed technology has been described above, but the present disclosure can be understood not only as an in-vehicle system, but also as a method executed by an in-vehicle system equipped with a processor or memory, a control program for the method, a computer-readable non-transitory recording medium storing the control program, a vehicle equipped with the in-vehicle system, or the like.

The in-vehicle system and the like of the present disclosure can be used, for example, when electric power supply of a vehicle is controlled.

What is claimed is:

1. An in-vehicle system comprising:
a first battery connected to a first load and configured to supply electric power to the first load;
a second battery connected to a second load and configured to supply the electric power to the second load;
a first relay configured to connect or disconnect a connection path between the first battery and the first load to a connection path between the second battery and the second load; and
a processor configured to
control turn-on and turn-off of the first relay to control a state of electric power supply from the first battery and the second battery to the first load and the second load,
detect an abnormality in the first battery and the second battery, and
determine a difference between a physical quantity indicating a state of the first battery and a physical quantity indicating a state of the second battery,
the processor being further configured to
when the processor detects the abnormality in the first battery or the second battery, turn off the first relay,
when the processor no longer detects the abnormality in the first battery and the second battery after the first relay is turned off, execute a discharging process for the first battery or the second battery until the processor determines that the difference between the physical quantities of the first battery and the second battery satisfies a predetermined condition,
when the processor determines that the difference between the physical quantities of the first battery and the second battery satisfies a predetermined condition, turn on the first relay,
on a condition that the abnormality in the first battery has been detected, the discharging process includes causing the first load consume the electric power of the first battery and stopping the operation of the second load in a state in which the first relay is turned off, and
on a condition that the abnormality in the second battery has been detected, the discharging process includes causing the second load consume the electric power of the second battery and stopping the operation of the first load in a state in which the first relay is turned off.

2. A non-transitory storage medium storing instructions that are executable by a processor of a computer of an in-vehicle system including a first battery connected to a first load and configured to supply electric power to the first load, a second battery connected to a second load and configured to supply the electric power to the second load, and a first relay configured to connect or disconnect a connection path between the first battery and the first load to a connection path between the second battery and the second load, and that cause the processor to perform functions comprising:
monitoring the first battery and the second battery, and turning off the first relay when an abnormality in the first battery or the second battery is detected;
when the abnormality in the first battery or the second battery is no longer detected after the first relay is turned off, executing a discharging process for the first battery or the second battery until determining whether a difference between a physical quantity indicating a state of the first battery and a physical quantity indicating a state of the second battery satisfies a predetermined condition; and turning on the first relay when a determination is made that the difference between the physical quantities of the first battery and the second battery satisfies the predetermined condition, wherein on a condition that the abnormality in the first battery has been detected, the discharging process includes causing the first load consume the electric power of the first battery and stopping the operation of the second load in a state in which the first relay is turned off, and wherein on a condition that the abnormality in the second battery has been detected, the discharging process includes causing the second load consume the electric power of the second battery and stopping the operation of the first load in a state in which the first relay is turned off.

3. The in-vehicle system according to claim 1, wherein the processor is configured to, when an absolute value difference between a voltage of the first battery and a voltage of the second battery is less than or equal to a first threshold value, determine that the difference between the physical quantities of the first battery and the second battery satisfies the predetermined condition.

4. The in-vehicle system according to claim 1, wherein the processor is configured to, when an absolute value difference between a state of charge of the first battery and a state of charge of the second battery is less than or equal to a second threshold value, determine that the difference between the physical quantities of the first battery and the second battery satisfies the predetermined condition.

5. The in-vehicle system according to claim 1, wherein the second load is a load redundantly arranged with respect to the first load.

6. The in-vehicle system according to claim 1, wherein the in-vehicle system is mounted in a vehicle.

7. A method that is executed by a computer of an in-vehicle system including a first battery connected to a first load and configured to supply electric power to the first load, a second battery connected to a second load and configured to supply the electric power to the second load, and a first relay configured to connect or disconnect a connection path between the first battery and the first load to a connection path between the second battery and the second load, the method comprising:

monitoring the first battery and the second battery, and turning off the first relay when an abnormality in the first battery or the second battery is detected;

when the abnormality in the first battery or the second battery is no longer detected after the first relay is turned off, executing a discharging process for the first battery or the second battery until determining whether a difference between a physical quantity indicating a state of the first battery and a physical quantity indicating a state of the second battery satisfies a predetermined condition; and turning on the first relay when a determination is made that the difference between the physical quantities of the first battery and the second battery satisfies the predetermined condition, wherein on a condition that the abnormality in the first battery has been detected, the discharging process includes causing the first load consume the electric power of the first battery and stopping the operation of the second load in a state in which the first relay is turned off, and wherein on a condition that the abnormality in the second battery has been detected, the discharging process includes causing the second load consume the electric power of the second battery and stopping the operation of the first load in a state in which the first relay is turned off.

8. The in-vehicle system according to claim 1, further comprising:

a second relay configured to connect or disconnect the first battery to the first load; and a third relay configured to connect or disconnect the second battery to the second load, wherein the processor is configured to when the processor detects the abnormality in the first battery, turn off the second relay together with the first relay, and when the processor detects the abnormality in the second battery, turn off the third relay together with the first relay.

9. The in-vehicle system according to claim 8, wherein on a condition that the abnormality in the first battery has been detected, the discharging process further includes turning on the second relay in a state in which the first relay is turned off, and on a condition that the abnormality in the second battery has been detected, the discharging process includes turning on the third relay in a state in which the first relay is turned off.

\* \* \* \* \*